United States Patent [19]

Pryor et al.

[11] 4,407,379

[45] Oct. 4, 1983

[54] HIGH ACCURACY FILLING MACHINES

[75] Inventors: Timothy R. Pryor, Tecumseh; Omer L. Hageniers, Windsor, both of Canada

[73] Assignee: Diffracto Ltd., Windsor, Canada

[21] Appl. No.: 273,115

[22] Filed: Jun. 12, 1981

[51] Int. Cl.³ .................... G01G 13/00; G01G 3/14
[52] U.S. Cl. .................................. 177/52; 177/103; 177/DIG. 6
[58] Field of Search ............... 177/52, 54, DIG. 6, 177/55, 103, 1

[56] References Cited

U.S. PATENT DOCUMENTS

| 2,158,023 | 5/1939 | Smith | 177/DIG. 6 |
| 3,339,651 | 9/1967 | Garnett | 177/103 X |
| 4,097,150 | 6/1978 | Wu | 177/DIG. 6 |

Primary Examiner—George H. Miller, Jr.
Attorney, Agent, or Firm—Larson & Taylor

[57] ABSTRACT

A method is provided for weighing and filling a plurality of containers. The method involves providing a plurality of moving weigh members each comprising a moveable member which is moveable in proportion to the weight of material in a container weighed by the weigh member, and a fixed reference member fixed with respect to the weigh member so as to move therewith. The position of the moveable member of each weigh member is automatically and electrooptically measured relative to the fixed reference member thereof. The weight of the material in the container is determined from the relative position of the moveable member with respect to the fixed reference member. Based on this determined weight, filling of the container, or subsequent filling of similar containers, is terminated, added to or subtracted from.

34 Claims, 7 Drawing Figures

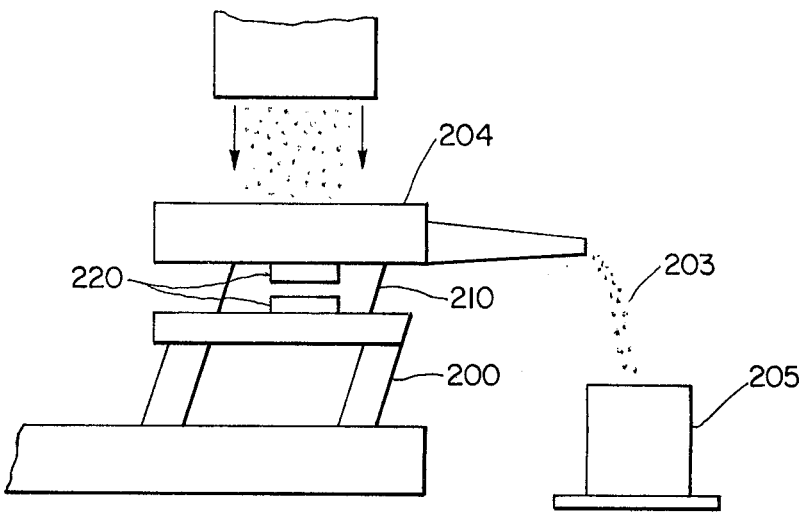
FIG. 2
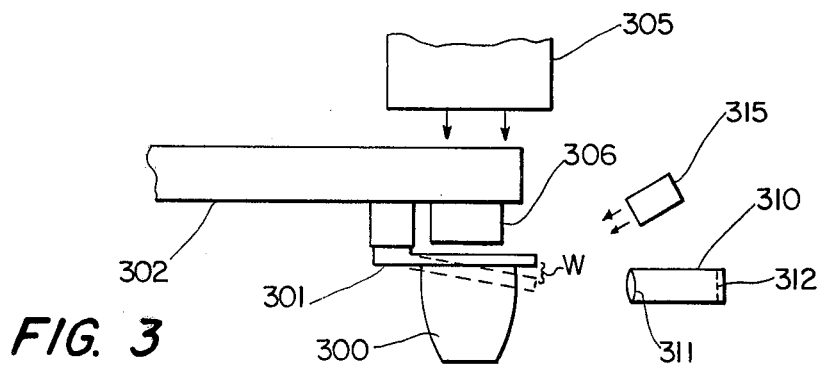
FIG. 3
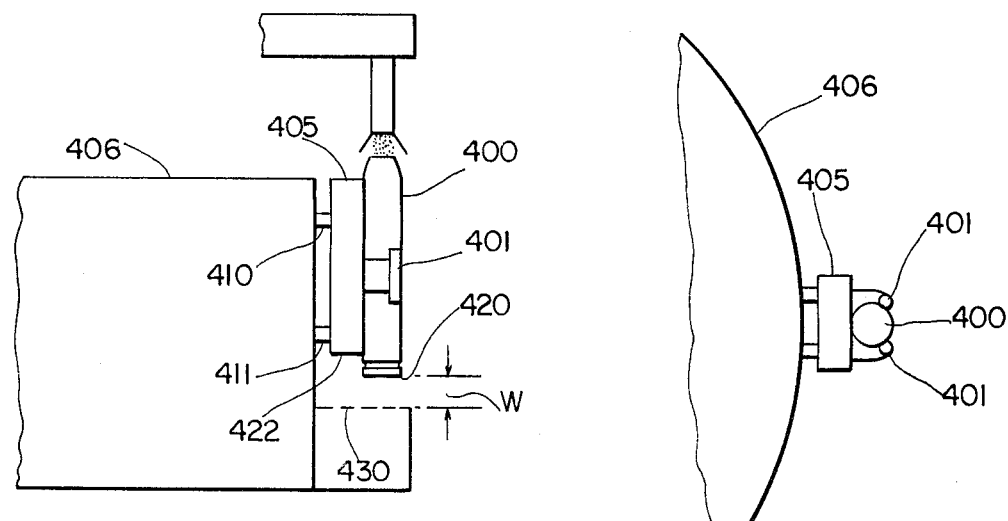
FIG. 4A
FIG. 4B

HIGH ACCURACY FILLING MACHINES

BACKGROUND

In a recent patent by the inventors, a novel optical weighing system was disclosed which provides extremely fast and accurate means for measuring product weights on the fly. The invention discloses optical measuring techniques to determine the deflection of elastic members loaded by the product being weighed as it moves past one or more sensing stations.

Disclosed herein is an extension of this concept, together with others, to the automatic control of filling machines. The particular embodiments disclosed are useful in the bottling and packaging industries but it is clear that the concepts here apply to any sort of fill in which a container is filled with a substance.

The general category in which the improvements here disclosed are of use is entitled "Fill and Weigh" or "Weigh and Dump". Typical prior art U.S. patents in this are are: Nos.
- 4,230,195, which teaches a servo-mechanical check weigh feedback filler for liquids
- 3,805,903, which teaches control algorithims for effective feedback of check weigher data to a filling machine or machines
- 3,339,651 disclosing a vibratory filler operable by tipping or increasing vibrator rate to deposit over or under weight recepticle batches in a reject area, with acceptable batches going to containers. Vibration is idle during a check weigh phase.
- 2,603,442, disclosing a bag filler wherein the input of bulk item flow is shut off when a desired bag weight is reached.

The above prior art references generally disclose means for doing the following:
1. In-process weighing of the container being filled near the end of the filling process to stop the process or determine if an additional amount (eg. "dribble", typically 5%) is required. Of particular interest here are those weighed on-the-fly, ie. at high speed.
2. In-process filling by weight of batches, receptacles etc. of material previous to dumping said batch into a container. This also is usually done in motion in a high speed system.
3. Filling by any convenient means, including volumetric, with post process monitoring (ie. check weighing) the weight of the filled packages and feeding back deviation data to controls on the filling machine.

In each of the above, the accuracy of weighing required limits the speed of the process, conversely, high speed limits accuracy. Improvement of such accuracy, particularly at the high speeds needed to achieve today's productivity requirements is the primary goal of this invention.

In addition, the invention discloses novel embodiments which:
- provide a means to monitor empty (tare) weights of containers at high speed to provide a true fill weight,
- provide means to monitor individual weights at high speed in continuous rotary motion.
- provide means to safely monitor dry product and other explosive material weights remotely with computer compatable outputs,
- provide total computer auto calibration of weigh pan and/or container each cycle,
- provide for operation with multiple types of containers in the same machine, even intermixed,
- provide for weight measurement of parts such as cartridge cases, pen refills etc. placed into spring clips, magnetic holders or the like,
- provide for ink jet coding of weight, date shift etc. information at high speed,
- provide for enhanced performance with vibratory fill systems,
- provide a unique ferris wheel or vertical rotary scale arrangement usable for scooping up product or vertically transfer any products,
- provide a vastly simpler mechanical apparatus than all known prior art, resulting in much less maintenance, with far higher rates.

It is the first intention of this invention to show means for improving the weight measurement capability of weighing type filling machines such as that described above, utilizing the concepts in our own weigh scale U.S. Pat. No. 4,216,837.

A second goal of this invention is to illustrate means for accurately weighing the container before fill as well as during or after fill such that the weight of the container can be removed from the weight calculation to allow a true calculation of net weight.

A third purpose of this invention is to illustrate improved means for monitoring weight throughout the filling cycle but particularly near the end of the cycle when a last topping-up or "dribble" type fill is provided. This utilizes continuous reading optical principles which may also be used in applying our weight scale patent.

Finally, application to both linear and rotary type scales is illustrated. Together with all the concepts above, a truely accurate weight based fill is possible for the first time in general not requiring additional compensating equipment after filling machine and completely obviating the historical difficulties with complex mechanical linkages, motions etc.

The further result of the above invention and improvements is the achievement of considerably higher filling rates under total control together with higher accuracies.

Additionally illustrated in this disclosure are further methods for controlling filling machines also electro-optically sensor based. These include automatic fill heighth detection by both transmited and reflected light means, and automatic optical flow meter controlled volumetric fill (the level detection also being a type of volumetric fill. Other means may also be utilized separately or in concert with the weigh based portion of the invention.

Another major advantage of the invention is that unlike those balance type units illustrated in the above references, this particular invention monitors over the total fill or at least has the capability thereof. Typically one has historically monitored only at the end, namely when the container is nearly filled. However, the advantage to monitoring over the total fill cycle is first to be able to weigh the container and second, to be able to measure the performance of the filling unit as a function of time. This can tend to allow prediction of the final fill condition and act as a further predictor of potential maintenance problems such as clogging, intermitent spurts etc. All of these plug the ability of the computer to track the performance of the machine allows for a much more easy to maintain machine.

The ease of maintenance also comes from the fact that in the prefered embodiment, the weigh members are load cells rather than balances and are vastly stiffer and without moving parts. This increased stiffness allows a much higher fill rate of the machine since for any given accuracy level, the vibrations of the machine or of the fill itself are not transmitted to the cells as readily as they are in the balance type machine. This of course is where the bottom line of most filling operations is, once a correct scheme for obtaining legal weight has been established. Naturally, the ability to hold the low limit of the legal weight allows a saving in material as well.

The very stiffness and extremely high resolution of the all optical non-contact readout further adds to accuracy allowing the cells herein to be both more accurate and capable at higher speeds than any previous design known. This is certainly true at least when one considers those which could be easily implemented on the filling machine whose very operation virtually requires a non-contacting type of readout.

As mentioned in the aforementioned patent by the inventors, the microcomputer of the readout (itself optional) may be used to track the individual cell constants and zero settings and actually a rezeroing process can occur each cyle of the machine by simply measuring the weight with no container at all on it after unloading. This of course is not at all possible with the machines as shown in the art and leads to the requirement for having to have a separate tracking system for adjusting calibration such as shown in U.S. Pat. No. 4,230,195.

Furthermore, any inputs from the outside such as provided by an operator etc. may be made electronically and are not required to be made mechanically, thereby eliminating large sources of error and maintenance problems.

The other interesting advantage of this machine is its ability to automatically and trivially account for changes in product. For example, it really doesn't matter what weight is desired in a package to be filled or what the package weight itself is, as long as it is within the range of the scale. Therefore one can change products, or fill levels, or containers, without really doing anything with the scale other than dialing in the settings desired, in net weight. This is a significant user benefit since typically highly skilled labor is required to set up such machines and this obviates the requirement therefore.

FIGURES

FIG. 2 illustrates schematically the operation of a vibrating scale receptacle according to the invention.

FIG. 3 illustrates a bag fill operation according to the invention.

FIGS. 4A and 4B illustrate an elevation and a plan view of an embodiment used to fill containers suspended in spring clips.

An approach which has been used to overcome the limitations of the volumetric scale in providing an accurate weight measurement is to monitor the actual weight of the containers during filling and cut off the fill when the correct weight is attained. A representative example of such a system is shown in Graffin, U.S. Pat. No. 4,230,195, which further includes means to weigh the filled containers at a further station off the filling machine and provide correction signals to the automatic weight control means.

Historically the amount of liquid or material used to fill the container has been determined by a positive displacement pump system which simply pumps in a volume of material. In many cases, however, due to jamming of the feed tubes etc. or other malfunctions, it cannot be assured that each particular line receives the same amount of liquid. Secondly, even when flow metering is applied to each of the particular spoiling spouts, again talking of liquid flows, it still possess some errors that cannot be accounted for.

Accordingly, the invention seeks to control the amount and actually the weight or mass of the liquid which is in many cases the unit of measure as opposed to volume, into the item to be filled. While liquid measures are typically in fluid measure, it is clear that virtually all dry products are however by weight and the direct control of weight in those cases, is desirable.

Figure 1:
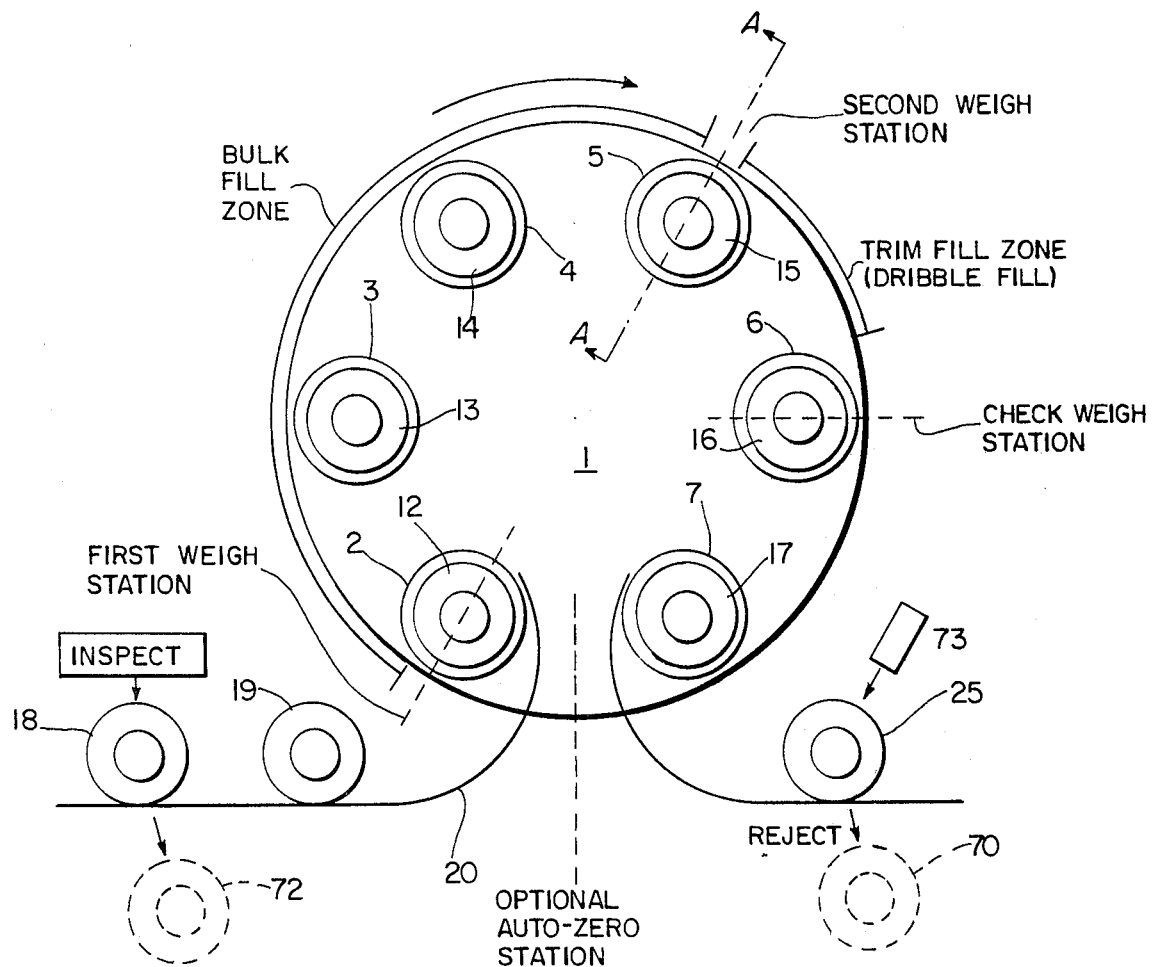
FIG. 1 illustrates a basic embodiment of the weighing type filling machine invention.
Figure 1A:
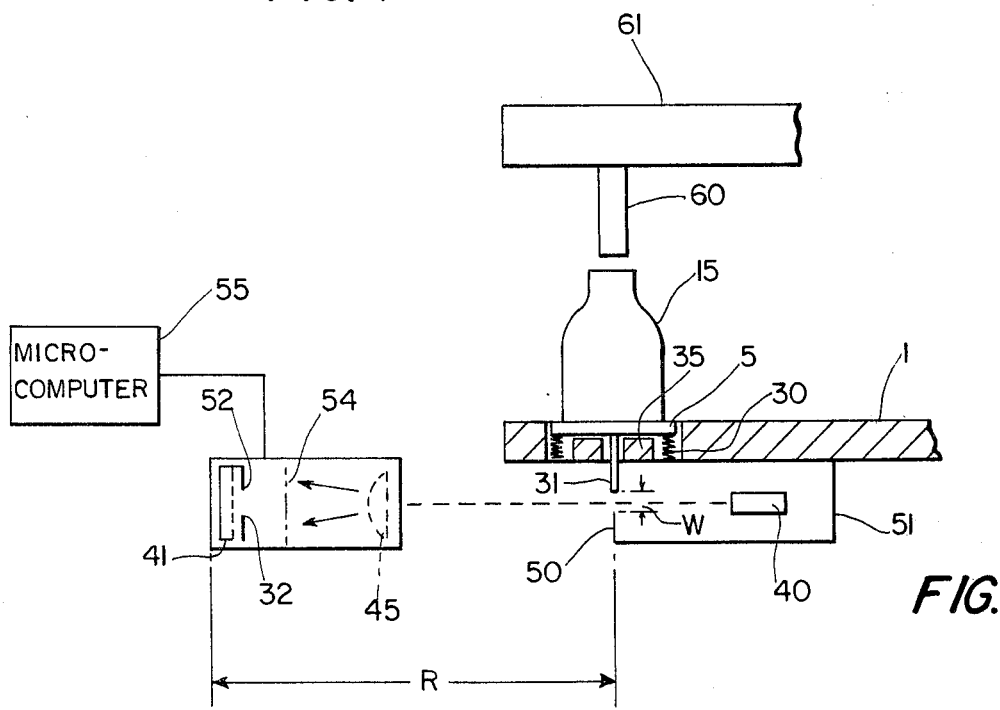
FIG. 1A illustrates a weighing device depicted in FIG. 1 and taken along the line A—A in FIG. 1.

The particular system disclosed here utilizes the weigh scale of our referenced patent, however, utilizing a series of such scales located in the filling machine itself. For example, consider FIG. 1 schematically depicting a rotary filling machine with cam operated multiple filling nozzles (not shown), filling ampules with insulin. The bottles enter the system in a continuous stream and go around from station to station in a rotary motion. In this particular embodiment, the bottles are first weighed at the first weigh station which is located at sufficient distance from the loading point to allow the loading impulse to settle. The bottles are all located on individual weigh members which are built into the base of the filling machine. At a rotational position just after first weighing, the filling spouts come in from above and as is normal practice, rotate with the bottle, injecting liquid into it as they continue their rotation.

Due to the fast rotary motion, the provision of flow meters to accurately control the individual fills is very difficult and positive displacement pumps are usually used, one per each fill tube. However, one can easily get short fills to do improper fill of the pump cavity etc. The invention avoids the problem by weighing the fill and providing other types of flow metering.

As the bottles arrive at the third station around to reach point B, they are essentially filled in the particular discussion here and the filled bottle is weighed. Via a microcomputer unit, the before and after weights are compared to determine the degree of fill. Optional reject means can be supplied to divert those bottles which are not accurately filled within the tolerances set.

In the mode just described, the unit utilizes a system which weighs only for the purpose of checking the fill. It is also possible to control the fill as well. Before discussing this, let us consider in detail the operation of the invention just discussed.

FIG. 1

A bottle filling machine according to the invention, is shown in FIG. 1 with construction somewhat similar to that shown, for example, in Graffin U.S. Pat. No. 4,230,195. As shown, a rotating disk 1, contains individual weigh pans 2 through 7, which are to be loaded with bottles to be filled 12–17. Incoming bottles are represented by 18 and 19 and others moving along guide track 20.

Bottles exiting the system such as 25, are filled.

The method is shown to illustrate the use of several factors. First, the use of the extremely advantageous optical weigh scale described in our U.S. Pat. No. 4,216,837 and shown here in cross section AA. In this case, the bottle rests on the pan 5 which is supported by for example an elastic weigh member 30. This weigh member can be a membrane, cantilever, springs, torsionbar or any other elastic element deflectable in proportion to load. A edge member 31 connected to the pan 5, moves up and down in proportion to the weight on the pan deflection through deflection of the elastic member 30. In many cases, the edge of the elastic member itself can be used as the edge member as well. Damping devices 35 may optionally be used and these damping may be any means known in the art for example, hydraulic, electro-magnetic etc.

When the weight is to be taken, a light source such as diode laser 40, illuminates the edge of member 31 and the edge image 32 is formed by lens 45 (shown on dotted lines) onto photo diode array 41.

Alternatively, a reference member such as 50 shown can be carried attached to disk 1 via means 51 and carried with this scale so as to provide a dual edge 52 and 32 image on array 41 whose spacing is proportional to the deflection under load of the pan and therefore to the weight of the part. If the reference edge such as 50 is not used, the measurement is then taken of edge image 32 relative to the assumed location of the disk 1 which can be somewhat in error due to flutter and wobble of the disc. Other suitable references however than an edge such as 50 placed directly below edge 31 can be used, but the arrangement shown is preferred.

When such an edge as 50 is utilized as a reference, and a laser source 40 is used, a diffraction pattern can also be created proportional to the gap width between the two, W. This is particularly useful where gaps are small, in the range of 1 mm or less. In this case, the lens 45 is not required and the diffraction pattern such as 54 can be read out directly by diode array 41 and interpolated as in the image case by microcomputer and analysis circuitry 55. Analysis basically uses the formula; gap, $W = R\lambda/S$ where S is the fringe spacing, is the wavelength of light and R is the distance from the gap to the diode array.

It should be noted that the light beam does not need to be oriented radially outward from the center of the disc, but may be in any other desirable orientation. One commonly used orientation is with the light beam tangential to the circle of the disc. This arrangement allows the edge image or diffraction pattern to be in view over a number of degrees of rotation of the disk. If for example in the diffraction pattern case, if the change in R value is compensated for over the rotation of the disk, a reading over at least 5° or 10° of rotation can be achieved in some cases.

The readout in this manner is extremely advantageous in that no slip rings are required and that extremely accurate measurements of the weigh member deflections may be made. Indeed, current systems running on one gram loads have resolutions, resolvable digitally using the all digital diode array readout and microcomputer, to within 0.3 microinches with a total pan deflection of a few thousandths of an inch at most. All this at 20 parts per second!

This performance contrasts greatly with the large deflection, cumbersome and extremely complex mechanical devices found in the prior art. Such stiffness and resolution yields both higher accuracies and higher speeds in such filling systems, and constitutes the intrinsic desirability of this invention.

As mentioned, no damping may be used or optionally, as is usually desirable, damping can be used, generally either of the magnetic or hydraulic type. In the same application mentioned above, magnetically damped by known principles, the one gram mass comes to rest within 20 milliseconds. This damping action in the context of a filling machine serves to damp out the initial empty bottle loading impulse if one is taring out the empty bottle weight (as will be described) as well as to damp the additional loading functions of the fluid or product being dropped or propelled into the container.

Any suitable light source may be utilized including gas lasers, diode lasers, LEDs, white light sources and Xenon flashes among others. With diffraction patterns, only the laser is suitable. It is often times desirable to use the pulse source either Xenon flashed or pulsed LED or diode laser to freeze the position of the image at a precise or diffraction pattern at a precise location. This allows the same point on the pan to be measured each cycle.

Alternatively, it is possible to accumulate readings on any one measurement of deflection. For example, since the reading rate of the diffraction pattern or image can be as high as 1000 readings per second, it is possible to obtain several readings on the pan while it is still in view; in some cases, many hundreds of readings. In this case, if one has liquid sloshing in the bottle etc., an average reading may be developed which tends to cancel this out and arrive at a true mean position.

Let us discuss now the layout of the invention to illustrate that, unlike prior art, taring out the weight of the container in a high speed system such as this can be readily accomplished.

It is not known in the prior art to utilize a load cell based system of this type in a rotary or linear high speed scale or filling machine. All other weigh and fill devices known have used balances. While balance type operation can be used there, they limit the ability to weigh the product at all points in the filling cycle. For example, in particular, it is desired to weigh the empty bottles (eg. at pan 2) just after they are loaded onto the machine. This empty bottle weight is then subtracted from the filled bottle weights obtained later in the rotation to arrive at the true answer via microcomputer 55.

A simple computation is involved, ie. full weight $= K(\Delta w)$, where K is the deflection constant of the individual scale and $\Delta w = (w\ \text{empty} - w\ \text{filled})$. If an external reference is used, w is measured relative to the optical axis of the lens system.

It is noted that weighing the empty bottle on its pan, also removes from the equation the build-up of residual filler material and any zero shift taking place in the system of measurement. While such zero shifts are very rare in an all-digital system such as this, it can be possible due to physical abuse etc.

After the first weight is taken, the filling proceeds. Fill is accomplished, for example, with a fill tube rotating with each of the individual bottles such as 60 mounted to disc 61 as is well known in the art. When the majority of the fill (ie. "bulk fill") has taken place, for example to 90 or 95% of a desired weight, a second weight reading (shown on pan 5) is taken to determine the amount remaining left to fill and this "trim" fill or "dribble" fill as it is known in the art is then applied. After this is complete and a third weigh or "check weigh" is performed on the container. Any check weigh deviation can be fed back to the dribble fill mechanism or the bulk fill mechanism as well. Such mechanisms can be magnetic adjustments on the fill, flow rates etc.

The bottles exiting the system such as 25, are pulled off, for example as is shown in the Graffin invention. If the check weigh has discovered an underweight or grossly overweight fill condition, this part can be rejected as shown by 73.

Also illustrated in this diagram, is the application of a inspecting station shown to inspect some of the incoming bottles 18 and 19. Such inspection has been shown in commonly owned application Ser. No. 15,792 which includes means for inspecting the lip, side walls etc. of the bottle for dimensions and defects. If the bottle is incorrect, provided proper fill or subsequent capping, the bottle is shunted off at this station as shown, 72.

FIG. 2

Improvements in bottle filling is not the only place an improvement can be made according to this invention.

The optical readout of elastic member or balance deflection is entirely feasible for use with other types of scales. For example, consider FIG. 2 which shows the application to a rotary type vibratory unload scale as shown in the Garnett U.S. Pat. No. 3,339,651 where the vibration of flexures 200 is used to shake material 203 off a weigh receptacle 204 into a container 205. In this case, it is the material in the weigh receptacle that is weighed, not the container and its contents. By momentarily turning off the vibration, one can have a situation where a weight reading can be taken accurately. This is extremely easy with the particular invention here, since the weigh scale can be a load cell 210 with edges such as 220 which can be placed directly onto the vibrating member. This is a big advantage in accuracy for such a system. Naturally, gap widths W proportional to receptacle weight can be read out on the fly with ease.

FIG. 3 illustrates another weigh member embodiment suitable for the "weigh and dump" type filling machines that operate by filling up a receptacle with powder or other product and then dumping said receptacle into the container. In this case, the weigh receptacle 300 is attached to a cantelever beam 301 which in turn is attached to the rotating disk 302. As the feed from the bulk feeder 305 is fed via funnel 306 into the weigh receptacle, the cantelever beam deflects downward. This deflection is monitored by an optical sensor unit according to the invention, 310 in this case a reflective image type incorporating lens 311 and diode array 312. While shown oriented radially looking at the light from the deflected cantilever illuminated by reflective source 315, it is also feasible according to the invention and in fact desirable to look at the deflection 'W' as a function using transmitted light. Indeed, the diffraction effect previously noted relative to a reference edge (not shown) fixed to the disk or, a measurement of the image directly including the reference or with a reference on the frame of the machine can be used as noted before.

One does not need to monitor the fill throughout the total fill cycle, but this is possible according to the invention as will be shown using multiple sensor units or continuous sweeping sensors etc.

It is noted that any other sort of deflecting means other than that shown utilizing the cantilever can be utilized. It should be noted that when a plurality of such units are utilized, disposed in a circle or in a line, that the individual calibration constants for each of the deflecting members or for that matter, even balance systems, can be stored in the computer and called up for the unit in question.

It should be noted that by replacing weigh receptacle 300, with a bag, that this device or other package connected to the cantilever, that this system becomes highly useable for bag type fill applications such as has been shown in the art. Bags are loaded on or formed on the machine, filled with product to deflect the cantilever or other weigh element to a given distance and then when the correct weight has been reached, the bags are stripped off and sealed.

It should be noted that while the embodiments shown previously indicate rotary action this same advantageous weigh system can be utilized in a linear transport form as well.

FIG. 4 illustrates another weigh member embodiment of the invention particularly suited to the non-contact measurement capabilities here disclosed. In this case, it is desired to fill up a container in this case, a cartridge case or pen refill with a product be it liquid or powder as the case may be. As is typical of extremely high speed systems on smaller parts, the container 400 is held by spring clips 401 into which it is pushed at a previous load station and stripped out of at a subsequent unload station.

In the particular embodiment shown, the spring clip is connected to a back plate 405 which in turn is held to a rotating disk 406 by reed type elastic members 410 and 411. To monitor the fill, an initial reading of the location of the bottom of the part 420 is made utilizing the imaging type optical system as has been described in the past, or with a diffraction system relative to an optional reference edge as shown 430 (dotted lines) carried with the disk. Indeed, in these sort of systems, the imaging type is generally preferred for the monitoring of part edge images, but even with imaging the reference edge member is desirable to remove the effects of table wobble and flutter of the disk. In short, both image points are utilized on the diode array as shown in FIG. 1.

As the filling takes place, the part sinks downward due to the weight of the fill and this downward movement is monitored. When it reaches the desired point, for example, the fill is cut off using known principles. Conversely, the other known rationales of bulk and trim fills etc. can also be performed but herein under control of the highly sensitive weigh device utilized herein.

It should be noted that while it is completely feasible according to the invention to monitor the part movement, it should be also noted that one can also monitor the movement of plate 405 (for example at edge 422) in its downward movement with increasing fill weight rather than the edge of the part itself. This would be necessary for example if there was any part slippage, for example experienced in the spring clips.

It is noted that the same approach can be used with metallic containers held by magnetic clips or strips or strips with other containers which can be held while allowing free gravitational attraction.

A centrifugal filling apparatus according to the invention, can also be constructed in which case weigh receptacle, or containers, are suspended by one or more elastic members such that the centrifugal force acting radially tends to produce a deflection which can be optically measured according to the invention. The microcomputer can monitor rotational speed and deflection to obtain filled weight.

Another novel feature of the invention, since the load carrying members may be extremely stiff, it is possible to actually have the weigh receptacles or containers for that matter, even used to scoop the material out of a bin or trough. The material scooped can be a liquid, or dry product for example or even numerous piece parts. Considering the case of scooping up numerous items such as candy from a bin, one can see that the weight of the material scooped up tends to deflect the member and the weight is thus measured at another point in the cycle when no drag force is present. Alternatively, drag force could be monitored and added to weight. Additional items may be added (if an underweight condition is sensed) one by one until the weight is correct. Alternatively, the estimated weight to make a correct amount computed and that amount added.

Figure 5:
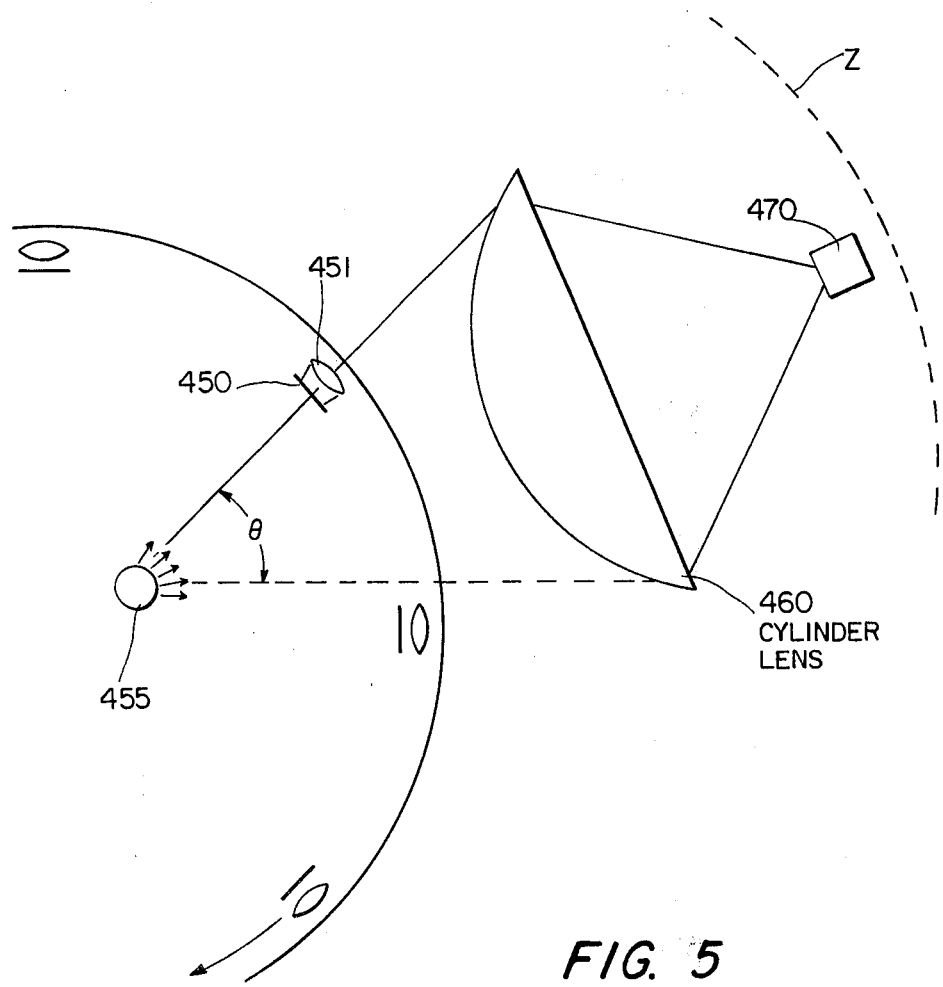
FIG. 5 illustrates an embodiment of the sensor portion of the invention utilized to provide continued weight measurement throughout a particular range of rotational or linear translation distances useful particularly at the end of the filling process. Monitoring even earlier in the process may also be done (to compensate the machine in the presence of somewhat malfunctioning fill tubes).

FIG. 5 illustrates continuous measurement of weight over a zone of rotation. Each weigh pan edge 450 has associated with it a lens 451 which forms an image of the edge in space on a plane z, the image swept circularly. A common light source 455 can be used, or one per scale if desired. Alternatively, a lens less diffraction system may be used if a laser source has been employed, using edge 450 and a reference edge as previously disclosed.

Cylinder lens 460 is employed to direct the edge image to diode array 470. Continued scans of said array can give over to 100 readings over a range of 45° of rotation at 60 RPM rotational rate.

It is noted in FIG. 1 that the microcomputer 55 can direct an ink jet, laser or other suitable printer to mark on the package its correct fill value or a serial number indicative of which filler filled it, usable for auto feedback of check weigh data performed later on.

Note too that fiber optics can be used in any of the embodiments to remote either the image diffraction pattern or light sources. This can be of considerable practical use in dust or other explosive environments.

Note that the fill rate as a result of any intermediate weighing operation, can be sped up or slowed down to arrive at a final predicted value. For example, in FIG. 1, if spout 60 was filling bottle 15 on pan 5 when it was weighed out at the second station and the rate of rill was too slow to reach final fill in time, it can be sped up on direction of microcomputer 55.

While FIG. 1 illustrates elastic spring members 30, other elastic member types can be used. One preferred type is double cantelivers or reeds such as 410 and 411 shown in FIG. 4. Cells built in this manner have considerably higher lateral and torsional stiffness, than a simple spring such as 30 or a single cantelever such as 301 in FIG. 3 and weight less influenced by where the material or part sits on the pan. It also is more resistant to rotation of the edge 31 which can cause small measurement errors.

As mentioned above, the use of damping is particularly desirable. Magnetic damping is of particular use with small loads.

What is claimed is:

1. In a method of weighing and filling a plurality of containers, the improvement comprising:
    providing a plurality of moving weigh members each comprising a moveable member moveable in proportion to the weight of material in a container weighed by the weigh member and a fixed reference member fixed with respect to the weigh member so as to move therewith,
    automatically and electro-optically measuring the position of the moveable member of each weigh member relative to the fixed reference member thereof,
    determining from the relative position of said moveable member with respect to said fixed reference member the weight of material in the container and,
    from said determined weight, terminating, adding to or subtracting from the filling of said container or subsequent fillings of similar containers.

2. A method according to claim 1 wherein said electro-optical measurement comprises determining the spacing of said moveable member from said reference member utilizing a diffraction pattern produced by a laser beam diffracted by said moveable and reference members.

3. A method according to claim 1 wherein said weigh member is a balance.

4. A method according to claim 1 wherein a light source used for said electro-optical measurement is pulsed when the weigh member is in a ready position, so as to freeze the position of said weigh member.

5. A method according to claim 1 wherein multiple measurements of the position of the moveable member of said weigh member are made in order to predict the true weigh in the presence of oscillating movement of said moveable member.

6. A method according to claim 1 wherein said electro-optical measurement further includes analysis using a micro computer.

7. A method according to claim 1 incorporating the further step of electro-optically inspecting containers entering said machine.

8. A method according to claim 1 wherein said containers are further utilized to scoop material out of a bulk storage area.

9. A method according to claim 1 wherein the individual calibration constants of said moveable member position proportional to weight are stored and utilized in determining said weight from said position.

10. A method according to claim 1 wherein a plurality of said containers are filled with random weights and one of said containers is selected to be dumped into package in order to trim fill said package.

11. A method according to claim 1 wherein said measurement is used to adjust the fill rate.

12. A method according to claim 1 wherein said container is a package, bag, bottle, or can.

13. A method according to claim 12 wherein a first position is measured when said container is empty to determine container weight and said container weight is subtracted from a subsequent weight of said container when filled to give true net fill weight.

14. A method according to claim 1 wherein said container comprises an intermediate receptacle used for temporarily storing material.

15. A method according to claim 14 wherein said intermediate receptacle is vibrated after said measurement to shake material out of it into a package.

16. A method according to claim 1 wherein said electro-optical measuring step comprises determining the position of the image of at least a portion of said moveable member and said reference member.

17. A method according to claim 16 wherein said determination of image position is accomplished by using a photo detector array.

18. A method according to claim 1 wherein said weigh members are moving in linear or circular motion.

19. A method according to claim 18 wherein said motion is circular and said axis of said electro-optical measurement is tangential.

20. A method according to claim 1 wherein said moveable member is an elastic member deflecting under the load of said container and fill.

21. A method according to claim 20 wherein said deflection of the moveable member of said weigh member is damped.

22. A method according to claim 20 wherein said deflection is measured by determining the change in position of the container due to filling.

23. A method according to claim 20 wherein said deflection is caused by gravity.

24. A method according to claim 20 wherein said deflection is due to centrifugal forces.

25. A method according to claim 1 wherein said measurement is performed at plurality of positions during the fill cycle, said positions being spaced in the direction of travel of said container.

26. A method according to claim 25 wherein said measurement is performed substantially continuously over at least a portion of said fill cycle.

27. A method according to claim 25 or 26 wherein the result of said measurement is used to terminate the fill process.

28. A method for rapidly weighing items or material, comprising the steps of:
(a) providing a plurality of weight members, each weigh member comprising means for receiving an item or material to be weighed, a moveable member moveable in proportion to the weight of said item or material and a fixed reference member fixed to the weigh member for movement therewith,
(b) providing a continuous path for movement of said weigh members in sequence along said continuous path,
(c) loading items or material to be weighed into said receiving means of the respective weigh members whereby the moveable member of each respective weigh member undergoes movement in response to the weight of said item or material, said movement being dependent upon the weight of said item or material, said weigh member further incorporating damping means to reduce any oscillations in said movement,
(d) impinging electro-magnetic radiation upon a boundary edge of said moveable member of a respective weigh member and a boundary edge of the fixed reference member of the respective weigh member,
(e) analyzing the radiation from said boundary edges to determine the weight of said item or material on said weigh member.

29. A method according to claim 28 wherein said loading and electro-magnetic radiation impinging steps occur substantially simultaneously.

30. A method according to claim 28 wherein said electro-magnetic radiation impinging step occurs at a further location in said continuous path from said loading step.

31. A method according to claim 30 including the further step of determining said weight at a plurality of said further locations.

32. A method according to claim 28 wherein said analysis step includes determining the spacing between said moveable member and said reference member.

33. A method according to claim 28 or 22 wherein said analysis step further includes the step forming an image of said edges and determining the location of said image of said edges relative to each other under a known weight of said item or material.

34. A method according to claim 32 wherein electromagnetic radiation is a laser beam such that a diffraction pattern is provided proportional to said spacing of said edges, and said diffraction pattern is analyzed to give said weight.

* * * * *